United States Patent [19]

Young et al.

[11] 4,183,164
[45] Jan. 15, 1980

[54] FISHING LURE

[76] Inventors: Walter M. Young, 27 Anderson St., Piedmont, S.C. 29673; Robert S. Young, Rte. 1, Pelzer, both of S.C. 29669

[21] Appl. No.: 786,650

[22] Filed: Apr. 11, 1977

[51] Int. Cl.² ............................................. A01K 85/00
[52] U.S. Cl. .................................... 43/42.09; 42/42.36
[58] Field of Search .................. 43/42.09, 42.47, 42.36

[56] References Cited

U.S. PATENT DOCUMENTS

| | | | |
|---|---|---|---|
| 1,352,054 | 9/1920 | Dills | 43/42.47 |
| 1,997,900 | 4/1935 | Edwards | 43/42.47 X |
| 2,593,220 | 4/1952 | Thompson et al. | 43/42.09 |
| 3,490,165 | 1/1970 | Thomassin | 43/42.09 |

FOREIGN PATENT DOCUMENTS 2290149  11/1973  France ...................... 43/42.09

*Primary Examiner*—William Pieprz
*Attorney, Agent, or Firm*—Bailey, Dority & Flint

[57] ABSTRACT

A fishing lure comprising a body of buoyant material which has an elongated hole extending into the front head portion thereof. The elongated hole is defined by walls which intersect each other at sharp angles. A lip member is inserted by means of an elongated shank portion within the elongated hole. The elongated shank portion has surfaces intersecting each other at complementary angles to the sharp edges of the elongated hole so as to prevent the shank portion from turning in the hole. An elongated screw member extends through the body of the lure and the shank portion for securing the lip member in the body. The lip member can be readily interchanged by removing the screw so as to affect the depth that the lure dives when fished.

3 Claims, 5 Drawing Figures

FISHING LURE

BACKGROUND OF THE INVENTION

The present invention relates to a fishing lure and, more particularly, to a fishing lure that has a lip member thereon which can be readily changed so as to vary the diving characteristics of the lure.

Fishing lures heretofore utilized normally incorporated an elongated body portion with a lip carried adjacent the front thereof for controlling the depth that the fishing lure runs when being fished. Examples of such fishing lures are disclosed in U.S. Pat. Nos. 3,367,057, 1,352,054, 2,441,302, and 3,483,651. One of the problems with such fishing lures is that the lip cannot be readily changed for varying the fishing characteristics of the lure.

Another problem with fishing lures heretofore utilized having lips provided thereon is that it was often impractical or impossible to position the lip properly on the front of the plug so as to enable the plug to run true or in a straight line. When the lip tilts to one side or the other, the lure will tend to run to the side rather than running straight as desired.

One particular lure presently on the market is constructed of balsa wood and has a lip attached to the lure by an elongated cylindrical shank which extends from the front of the lure to the rear of the lure. This shank portion is secured within the body of the lure by means of glue and a screw extending from the bottom thereof into the shank. As a result of the lip being glued within the balsa body, the lip cannot be changed for varying the running characteristics of the lure.

SUMMARY OF THE INVENTION

The invention pertains to a fishing lure comprising a body of buoyant material such as high impact foam having a generally fish shape with a front head portion and a rear tail portion. An elongated hole extends into the front head portion of the lure and is defined by walls which intersect each other at sharp angles. A lip member is secured to the front of the lure for controlling the diving action of the lure when being fished. The lip member has an enlarged planar forward surface and an elongated shank portion which extends into the elongated hole provided in the body of the lure. The shank portion fits tightly within the hole and has surfaces intersecting each other at complementary angles to the shape of the angles of the elongated hole so as to prevent the shank portion from turning in the hole. An elongated screw member extends through the body of the lure and the shank portion for securing the lip member to the body. An eye is carried on the remote end of the screw member for receiving a treble hook. Another treble hook is generally secured to the rear end of the lure. As a result of the shank portion of the lip member corresponding to the shape of the elongated hole provided in the body, the lip is positively positioned relative to the fishing lure eliminating the necessity of trueing the lip.

When it is desired to change the lip from a deep running lip to a shallow running lip, it is only necessary to remove the elongated screw and substitute another lip therefor.

Accordingly, it is an object of the present invention to provide a fishing lure which has a lip secured thereto which is accurately positioned so as to enable the lure to run true when being fished.

Another object of the present invention is to provide a fishing lure which has a lip member provided thereon which can be readily changed so as to vary the fishing characteristics of the lure.

Still another important object of the present invention is to provide a fishing lure which is constructed of a high impact foam which does not become waterlogged when the painted surface provided thereon becomes damaged.

These and other objects and advantages of the invention will become apparent upon reference to the following specification, attendant claims, and drawing.

DESCRIPTION OF A PREFERRED EMBODIMENT

Figure 1:
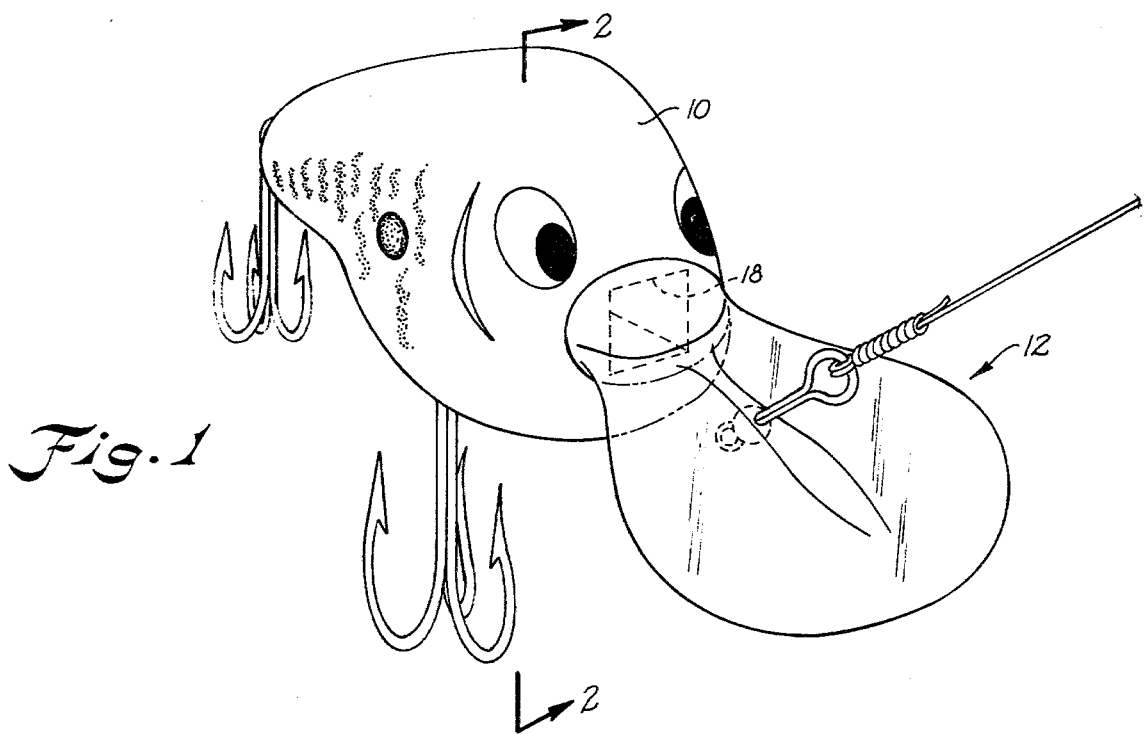
FIG. 1 is a perspective view illustrating a fishing lure constructed in accordance with the present invention.

Referring in more detail to FIG. 1, there is illustrated a fishing lure which has a body 10 constructed of buoyant material. The buoyant material may be any suitable high impact foam material that is susceptible to being injection molded. In one particular embodiment, the high impact foam material forming the body of the lure includes monthane FM 437 PXM and polyisonate 675. The body of the lure is coated with different colored paints in a conventional manner so as to be attractive to fish.

Figures 3A, 3B, 3C:
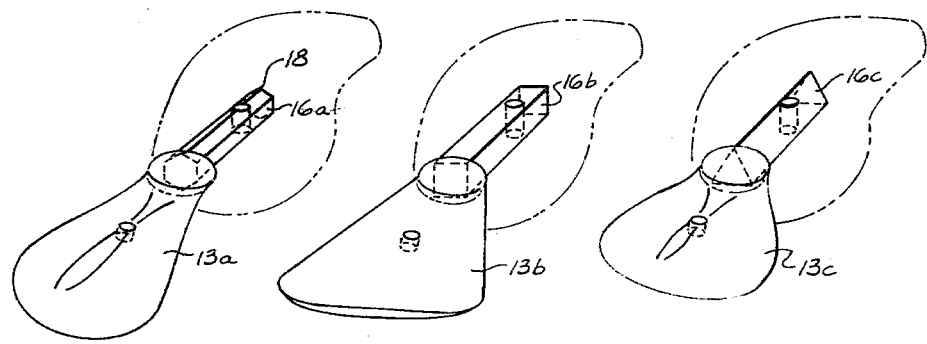
FIGS. 3a through 3c illustrate different types of lip members and shapes of the shank portions and holes provided in the fishing lure that may be utilized.

A lip member generally designated by the reference character 12 is carried adjacent the front of the lure. The lip member includes an enlarged planar forward surface 13 which controls the depth that the lure dives when being fished. An intermediate portion 14 abuts against a substantially flat surface adjacent the front portion of the main body 10. The upper surface of the intermediate portion 14 is arcuate so as to conform with the curvature of the lure. Extending rearwardly and integral with the intermediate portion is a shank portion 16. This shank portion may be constructed in different shapes such as illustrated in FIGS. 3a through 3c. In FIG. 3a, the shank portion has surfaces which intersect at sharp angles relative to each other so as to define an octangonal shape.

The intermediate portion 14 is interposed between the lip member 12 and the elongated shank portion and has an arcuate forward surface conforming with the curvature of the front head portion of the lure and a substantially planar vertically extending rear surface. The elongated shank portion 16 is integral with and extends rearwardly from the medial portion of the planar vertically extending rear surface of the intermediate member.

In FIG. 3b, the surfaces of the shank portion 16 intersect with each other to form a substantially square-shaped cross-section. In FIG. 3c, the shank portion 16c is triangular in shape.

An elongated slot 18 extends from the front of the plug into the main body portion of the plug an corresponds in shape to the desired shank portion 16 which is to fit therein.

Figure 2:
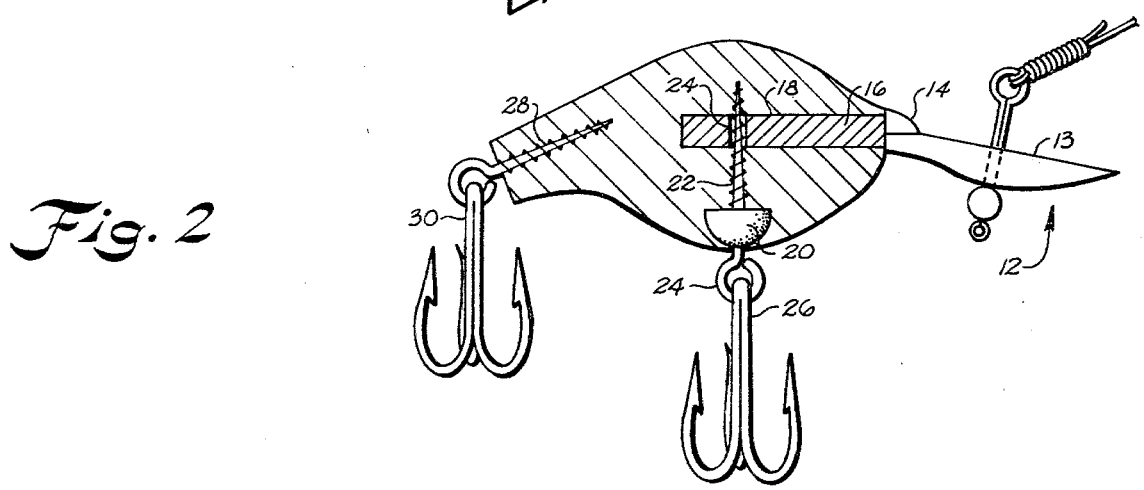
FIG. 2 is a sectional view taken along line 2—2 of FIG. 1.

In FIGS. 1, 2 and 3b, the slot has a substantially square cross-section for receiving a substantially square cross-section shank portion. This prevents the shank portion 16 from rotating within the slot 18 so as to maintain the lip member 18 in proper alignment. A weight 20, taking the shape of a half shot, is carried adjacent the bottom of the lure for adding weight thereto. An elongated screw member 22 is threaded through the weight 20 and a hole 24 provided in the shank portion 18 for securing the lip member 12 to the body of the lure. The remote end on the screw member has an eye 24 provided thereon for receiving a treble hook 26.

A similar screw member 28 is threaded in a rear portion of the lure and has a treble hook 30 secured thereto.

As a result of the shank portion 16 of the lip 12 being secured within the elongated hole 18 by means of the screw 22, it can be readily changed to a different style and type of lip member. As illustrated in FIGS. 3a through 3c, there are three different shaped lip members, 13a, 13b and 13c, each of which provides a different fishing characteristic for the lure. For example, the lip 13, would cause the lure to run deeper when being fished than the lip 13b.

It is to be understood, of course, that the shape of the shank portion 16 always corresponds to the shape of the hole 18 so that there will be a tight fit therebetween. In FIG. 3a, the hole 18 has an octagonal cross-section and the shank portion 16a has a corresponding octagonal cross-section. In FIG. 3b, both the hole and the shank portion 16b have a substantially square cross-section. In FIG. 3c, the hole and the shank portion 16c have a triangular shape cross-section. These shapes prevent the lip member 13 from rotating within the hole.

The lip members may be constructed of any suitable material such as clear plastic which is commonly used for fishing lures and, in one particular embodiment, the plastic is a buriterate material.

While a preferred embodiment of the invention has been described using specific terms, such description is for illustrative purposes only, and it is to be understood that changes and variations may be made without departing from the spirit or scope of the following claims.

What is claimed is:

1. A fishing lure comprising a body of buoyant material having a generally fish shape with a front head portion and a rear tail portion,
    an elongated hole extends into said front head portion, said elongated hole being defined by walls which intersect each other at sharp angles,
    a lip member having:
        (a) an enlarged planar forward surface,
        (b) an elongated shank portion corresponding in shape with said elongated hole for providing a tight fit therebetween, said shank portion having surfaces of substantially the same width intersecting each other at complementary angles to the sharp angles of said elongated hole so as to prevent said shank portion from turning in said hole, and
    an intermediate portion interposed between said planar forward surface and said elongated shank portion,
    said intermediate portion having an arcuate forward surface conforming with the curvature of said front head portion of said lure, and a substantially planar vertically extending rear surface,
    said elongated shank portion being integral with and extending rearwardly from a medial portion of said planar vertically extending rear surface,
    an elongated screw member extends through the body of said lure and said shank portion for securing said lip member to said body,
    an eye carried on end of said screw member, and
    a hook secured to said eye.

2. The fishing lure as set forth in claim 1 wherein said elongated hole and said elongated shank portion have a substantially square cross-section.

3. The fishing lure as set forth in claim 1 wherein said elongated hole and said elongated shank portion have a substantially triangular cross-section.

* * * * *